(12) United States Patent
Lai

(10) Patent No.: US 7,172,173 B1
(45) Date of Patent: Feb. 6, 2007

(54) SWITCH VALVE HAVING A LOCKING EFFECT

(75) Inventor: Hung-Lin Lai, Changhua Hsien (TW)

(73) Assignee: Wen Sheng Fu Co., Ltd., Lu Kang (TW)

( * ) Notice: Subject to any disclaimer, the term of this patent is extended or adjusted under 35 U.S.C. 154(b) by 0 days.

(21) Appl. No.: 11/092,441

(22) Filed: Mar. 29, 2005

(51) Int. Cl.
*F16K 51/00* (2006.01)
(52) U.S. Cl. .................. 251/288; 137/382.5
(58) Field of Classification Search ............... 251/286, 251/288; 137/382, 382.5
See application file for complete search history.

(56) References Cited

U.S. PATENT DOCUMENTS

| 2,009,358 A | * | 7/1935 | Fennema | 251/163 |
| 2,142,368 A | * | 1/1939 | Mueller | 251/286 |
| 3,453,655 A | * | 7/1969 | Quinones et al. | 137/296 |
| 6,409,148 B1 | * | 6/2002 | Dempsey et al. | 251/288 |

* cited by examiner

Primary Examiner—Edward K. Look
Assistant Examiner—John K. Fristoe, Jr.
(74) Attorney, Agent, or Firm—Alan D. Kamrath; Nikolai & Mersereau, P.A.

(57) ABSTRACT

A switch valve includes a valve body, a control stem rotatably mounted on the valve body, a limit ring mounted on the valve body, a locking member secured on the control stem and hidden in the limit ring, and a rotation head removably mounted on the limit ring and detachably engaged with the locking member. Thus, the locking member is only rotated by rotation of the rotation head to rotate the control stem so as to open/close the water flow in the valve body, so that the switch valve has a locking effect, thereby preventing the switch valve from being opened by a person intentionally.

14 Claims, 6 Drawing Sheets

SWITCH VALVE HAVING A LOCKING EFFECT

BACKGROUND OF THE INVENTION

1. Field of the Invention

The present invention relates to a switch valve, and more particularly to a switch valve having a locking effect.

2. Description of the Related Art

A conventional switch valve in accordance with the prior art shown in FIG. 6 comprises a valve body 10, a control stem 11 rotatably mounted on the valve body 10 to open/close a water flow in the valve body 10, and a rotation head mounted on the control stem 11 for rotating the control stem 11 so as to open/close the water flow in the valve body 10. Thus, the switch valve can be closed when not in use. However, the control stem 11 is not locked by a locking device, so that the control stem 11 can be rotated freely by any person to open the water flow in the valve body 10, thereby easily wasting the water resource.

SUMMARY OF THE INVENTION

In accordance with the present invention, there is provided a switch valve, comprising a valve body, a control stem rotatably mounted on the valve body to open/close a water flow in the valve body, a limit ring mounted on the valve body to encompass the control stem, a locking member secured on the control stem for rotating the control stem and hidden in the limit ring, and a rotation head removably mounted on the limit ring and detachably engaged with the locking member for rotating the locking member.

The primary objective of the present invention is to provide a switch valve having a locking effect.

Another objective of the present invention is to provide a switch valve, wherein the locking member is only rotated by rotation of the rotation head to rotate the control stem so as to open/close the water flow in the valve body, so that the switch valve has a locking effect, thereby preventing the switch valve from being opened by a person intentionally.

A further objective of the present invention is to provide a switch valve, wherein the drive head of the locking member is fully hidden in the through hole of the limit ring, so that the locking member cannot be driven to rotate by a person's fingers or by other tool, thereby preventing the control stem from being operated freely to open the water flow in the valve body so as to save the water resource.

Further benefits and advantages of the present invention will become apparent after a careful reading of the detailed description with appropriate reference to the accompanying drawings.

DETAILED DESCRIPTION OF THE INVENTION

Figure 1:
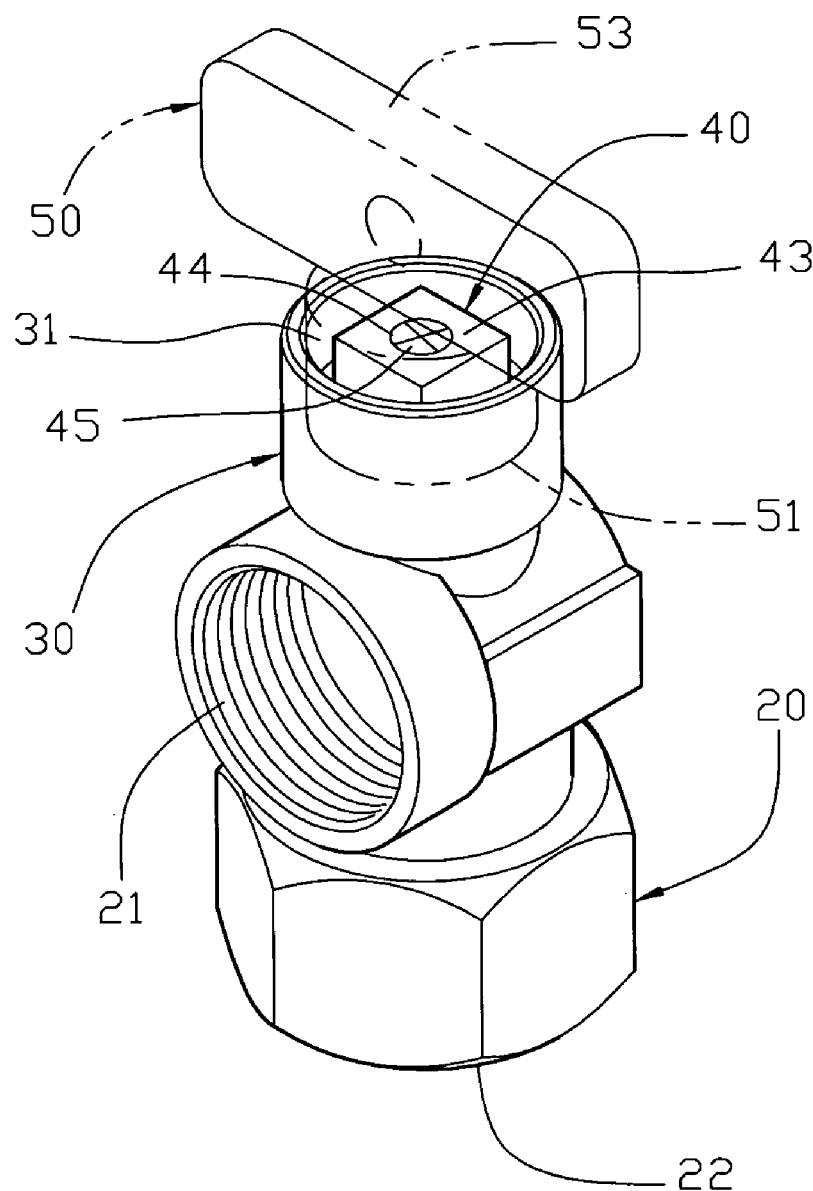
FIG. 1 is a perspective view of a switch valve in accordance with the preferred embodiment of the present invention.
Figure 2:
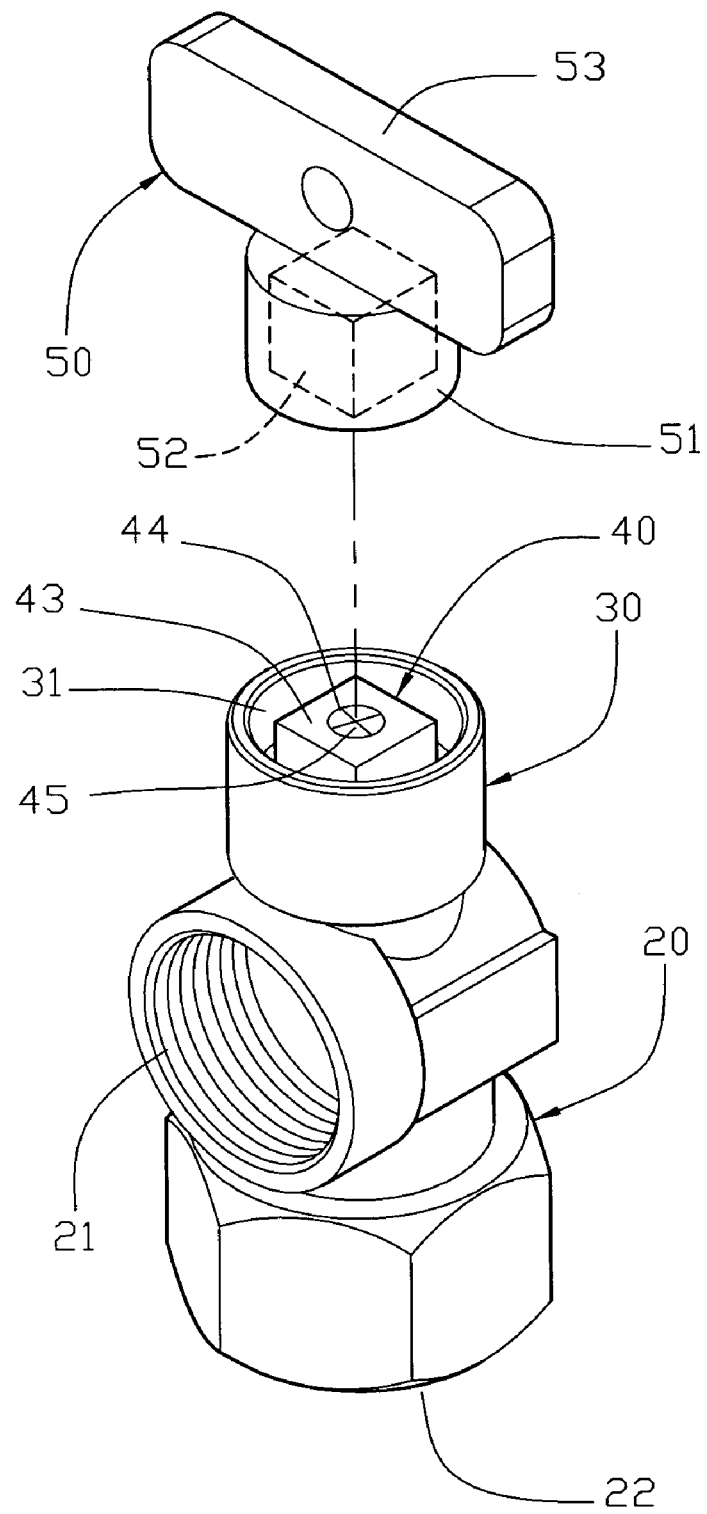
FIG. 2 is a partially exploded perspective view of the switch valve as shown in FIG. 1.
Figure 3:
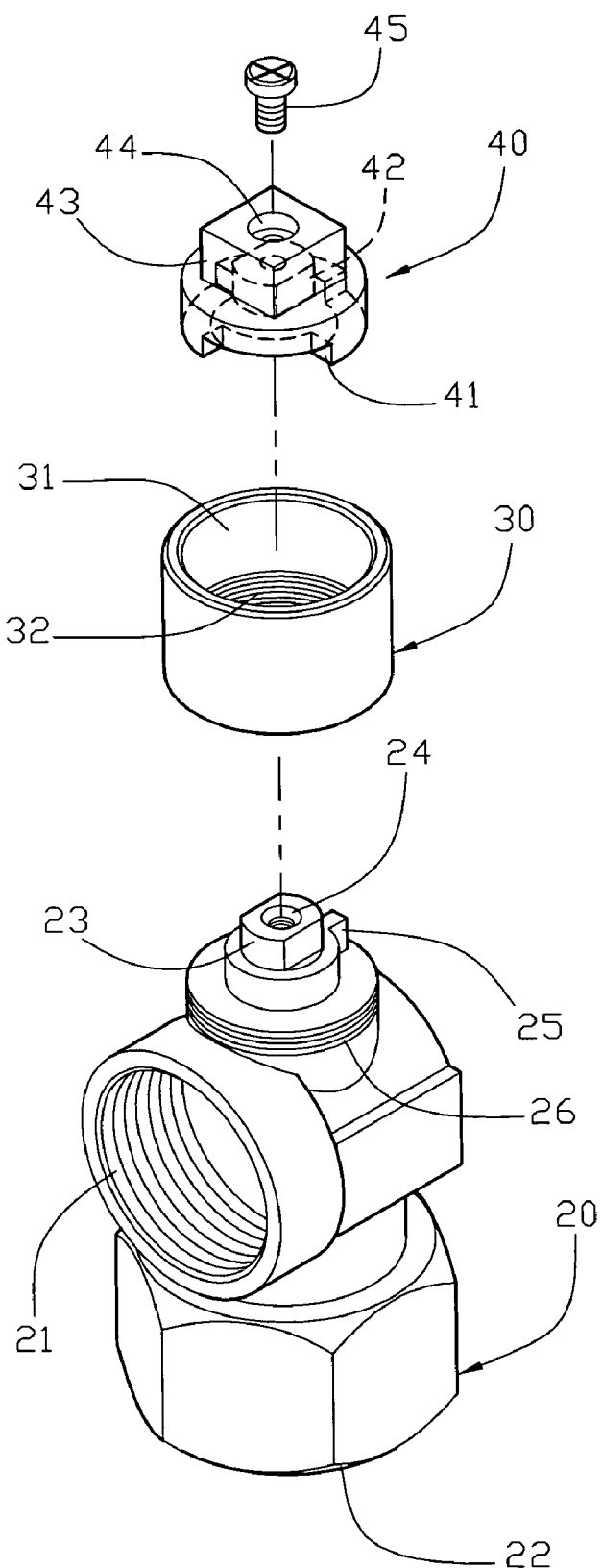
FIG. 3 is an exploded perspective view of the switch valve as shown in FIG. 1.

Referring to the drawings and initially to FIGS. 1–4, a switch valve in accordance with the preferred embodiment of the present invention comprises a valve body 20, a control stem 23 rotatably mounted on the valve body 20 to open/close a water flow in the valve body 20, a limit ring 30 mounted on the valve body 20 to encompass the control stem 23, a locking member 40 secured on the control stem 23 for rotating the control stem 23 and hidden in the limit ring 30, and a rotation head 50 removably mounted on the limit ring 30 and detachably engaged with the locking member 40 for rotating the locking member 40.

The valve body 20 has a water inlet 21 and a water outlet 22. The valve body 20 has a peripheral wall formed with a threaded locking section 26 and has a side formed with a protruding limit portion 25 located on a periphery of the control stem 23. The control stem 23 has an inside formed with a screw bore 24.

The limit ring 30 has a smooth outer wall and has an inner wall formed with a through hole 31 for receiving the locking member 40. The inner wall of the limit ring 30 has an end formed with a threaded locking section 32 locked on the locking section 26 of the valve body 20 to fix the limit ring 30 on the valve body 20.

The locking member 40 is fully hidden in the through hole 31 of the limit ring 30 and rotatably mounted on the valve body 20. The locking member 40 has an inside formed with a fixing hole 42 secured on the control stem 23. The locking member 40 has a first end formed with a square drive head 43 and a second end formed with an arc-shaped limit slot 41 to slidably receive the limit portion 25 of the valve body 20. The drive head 43 of the locking member 40 has an inside formed with a counterbore 44 connected to the fixing hole 42 and aligned with the screw bore 24 of the control stem 23. The drive head 43 of the locking member 40 has a height smaller than that of the through hole 31 of the limit ring 30 so that the drive head 43 of the locking member 40 is fully hidden in the through hole 31 of the limit ring 30.

A locking screw 45 is extended through the counterbore 44 of the locking member 40 and screwed into the screw bore 24 of the control stem 23 to fix the locking member 40 on the control stem 23.

The rotation head 50 has a first end formed with a circular plug 51 removably inserted into the through hole 31 of the limit ring 30 and having an inside formed with a square mounting hole 52 detachably mounted on the drive head 43 of the locking member 40. The rotation head 50 has a second end formed with an elongated control handle 53 to facilitate a user holding the rotation head 50.

Figure 4:
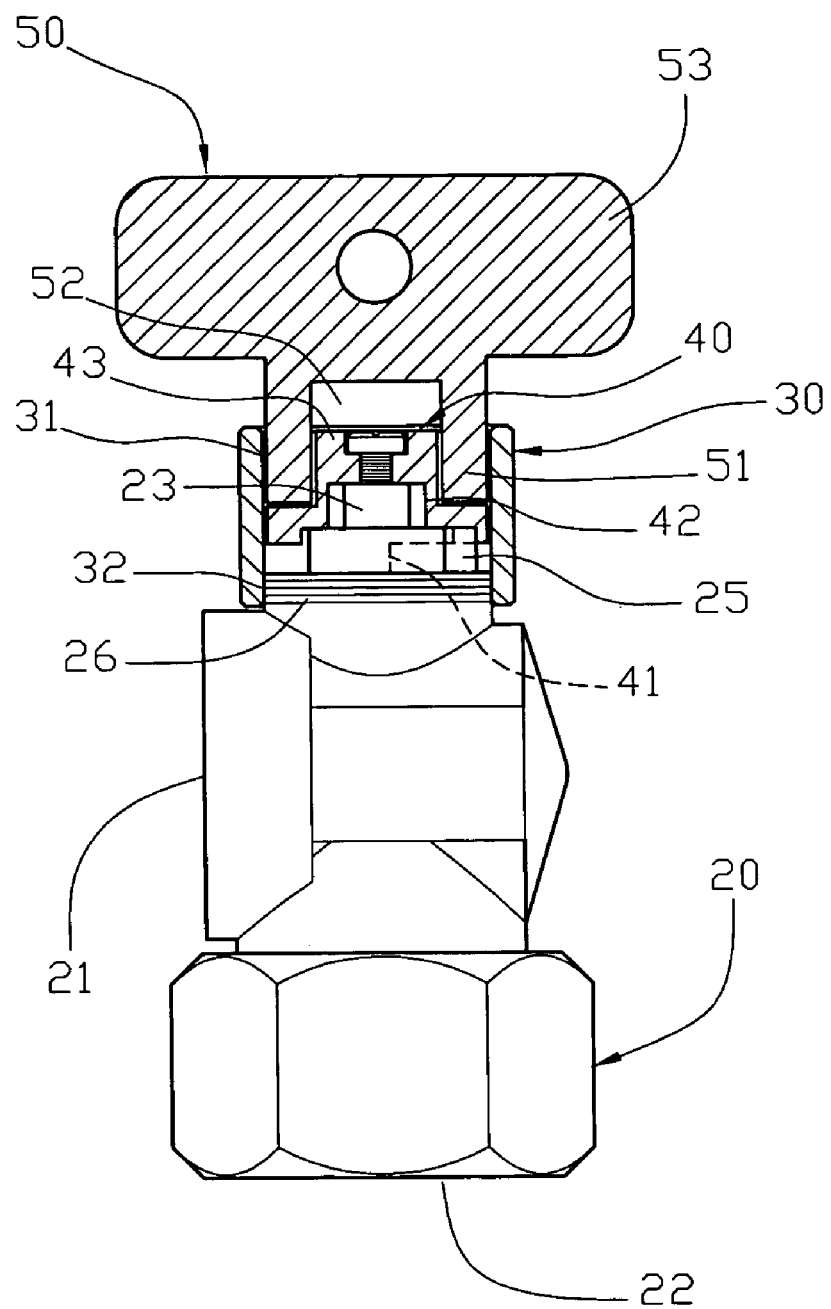
FIG. 4 is a plan cross-sectional view of the switch valve as shown in FIG. 1.

In operation, referring to FIGS. 1–5, when the rotation head 50 is mounted on the limit ring 30 and the locking member 40 as shown in FIGS. 1 and 4, the plug 51 of the rotation head 50 is inserted into the through hole 31 of the limit ring 30, and the mounting hole 52 of the rotation head 50 is mounted on the drive head 43 of the locking member 40, so that the rotation head 50 is fixed on the locking member 40. Thus, the locking member 40 is rotated by rotation of the rotation head 50 to rotate the control stem 23 so as to open/close the water flow in the valve body 20.

Figure 5:
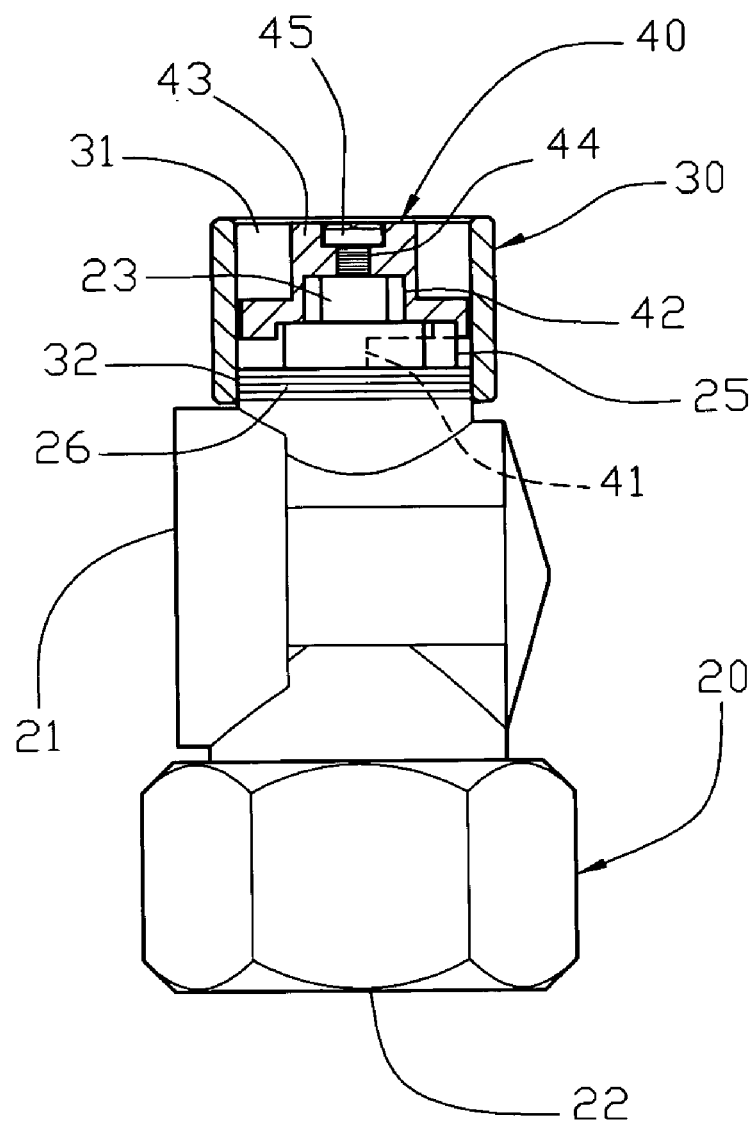
FIG. 5 is a plan cross-sectional view of the switch valve as shown in FIG. 1, wherein the rotation head is removed.
Figure 6:
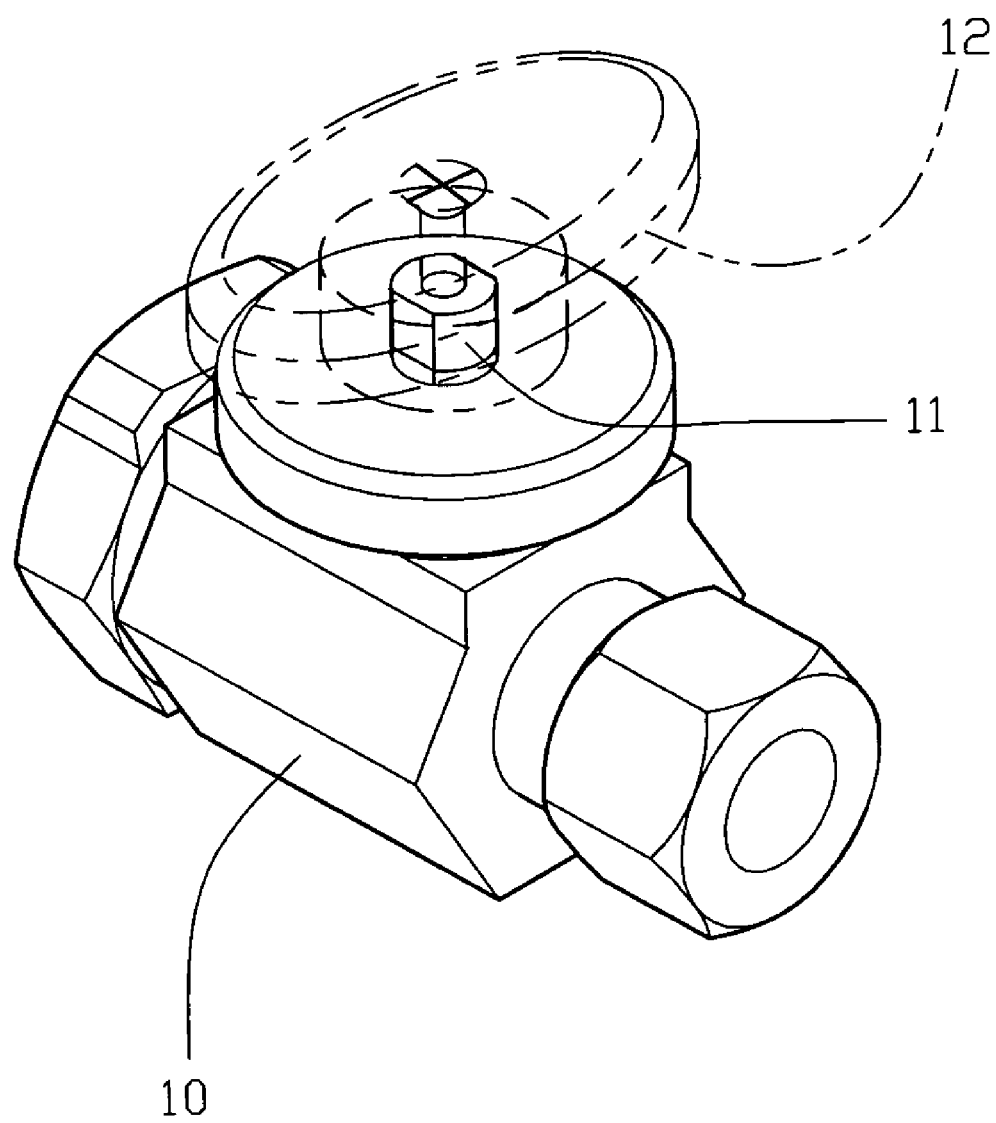
FIG. 6 is a perspective view of a conventional switch valve in accordance with the prior art.

After the rotation head 50 is removed from the limit ring 30 and the locking member 40 as shown in FIG. 5, the drive head 43 of the locking member 40 is fully hidden in the through hole 31 of the limit ring 30, so that the locking member 40 cannot be driven to rotate by a person's fingers or by other tool, thereby preventing the control stem 23 from being operated freely to open the water flow in the valve body 20 so as to save the water resource.

Accordingly, the locking member 40 is only rotated by rotation of the rotation head 50 to rotate the control stem 23 so as to open/close the water flow in the valve body 20, so that the switch valve has a locking effect, thereby preventing the switch valve from being opened by a person intentionally. In addition, the drive head 43 of the locking member 40 is fully hidden in the through hole 31 of the limit ring 30, so that the locking member 40 cannot be driven to rotate by a person's fingers or by other tool, thereby preventing the control stem 23 from being operated freely to open the water flow in the valve body 20 so as to save the water resource.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A switch valve, comprising:
   a valve body;
   a control stem rotatably mounted on the valve body to open/close a water flow in the valve body;
   a limit ring mounted on the valve body to encompass the control stem;
   a locking member secured on the control stem for rotating the control stem and hidden in the limit ring;
   a rotation head removably mounted on the limit ring and detachably engaged with the locking member for rotating the locking member;
   wherein the locking member has a first end formed with a drive head, and the rotation head has a first end formed with a plug removably inserted into the through hole of the limit ring and having an inside formed with a mounting hole detachably mounted on the drive head of the locking member.

2. The switch valve in accordance with claim 1, wherein the valve body has a peripheral wall formed with a threaded locking section, and the limit ring has an inner wall having an end formed with a threaded locking section locked on the locking section of the valve body to fix the limit ring on the valve body.

3. The switch valve in accordance with claim 1, wherein the limit ring has a smooth outer wall.

4. The switch valve in accordance with claim 1, wherein the locking member has an inside formed with a fixing hole secured on the control stem.

5. The switch valve in accordance with claim 1, wherein the limit ring has an inner wall formed with a through hole for receiving the locking member.

6. The switch valve in accordance with claim 5, wherein the locking member is fully hidden in the through hole of the limit ring.

7. The switch valve in accordance with claim 1, wherein the locking member is rotatably mounted on the valve body.

8. The switch valve in accordance with claim 1, wherein the plug of the rotation head has a circular shape.

9. The switch valve in accordance with claim 1, wherein the drive head of the locking member has a square shape, and mounting hole of the rotation head has a square shape.

10. The switch valve in accordance with claim 1, wherein the valve body has a side formed with a protruding limit portion located on a periphery of the control stem, and the locking member has a second end formed with a limit slot to slidably receive the limit portion of the valve body.

11. The switch valve in accordance with claim 10, wherein the limit slot is substantially arc-shaped.

12. The switch valve in accordance with claim 1, wherein the rotation head has a second end formed with an elongated control handle to facilitate a user holding the rotation head.

13. The switch valve in accordance with claim 1, wherein the drive head of the locking member has a height smaller than that of the through hole of the limit ring so that the drive head of the locking member is fully hidden in the through hole of the limit ring.

14. The switch valve in accordance with claim 1, wherein the control stem has an inside formed with a screw bore, the drive head of the locking member has an inside formed with a counterbore aligned with the screw bore of the control stem, and the switch valve further comprises a locking screw extended through the counterbore of the locking member and screwed into the screw bore of the control stem to fix the locking member on the control stem.

* * * * *